US008957812B1

(12) United States Patent
Hill et al.

(10) Patent No.: US 8,957,812 B1
(45) Date of Patent: Feb. 17, 2015

(54) POSITION TRACKING SYSTEM AND METHOD USING RADIO SIGNALS AND INERTIAL SENSING

(75) Inventors: Edward Hill, Portsmouth, NH (US); Mark Schneider, Williston, VT (US)

(73) Assignee: Position Imaging, Inc., Portsmouth, NH (US)

( * ) Notice: Subject to any disclaimer, the term of this patent is extended or adjusted under 35 U.S.C. 154(b) by 273 days.

(21) Appl. No.: 13/293,639

(22) Filed: Nov. 10, 2011

Related U.S. Application Data

(60) Provisional application No. 61/413,026, filed on Nov. 12, 2010.

(51) Int. Cl.
*G01S 3/02* (2006.01)
*G01S 5/04* (2006.01)

(52) U.S. Cl.
USPC ............................. 342/465; 342/445; 342/463

(58) Field of Classification Search
CPC ............ G01S 3/48; G01S 5/0221; G01S 5/14
USPC ........ 342/437, 445, 463, 465; 455/456.6, 457
See application file for complete search history.

(56) References Cited

U.S. PATENT DOCUMENTS

| 3,940,700 | A | 2/1976 | Fischer |
| 5,010,343 | A | 4/1991 | Andersson |
| 5,426,438 | A | 6/1995 | Peavey et al. |
| 5,574,468 | A | 11/1996 | Rose |
| 5,600,330 | A | 2/1997 | Blood |
| 5,657,026 | A | 8/1997 | Culpepper et al. |
| 5,923,286 | A | 7/1999 | Divakaruni |
| 5,953,683 | A | 9/1999 | Hansen et al. |
| 6,167,347 | A | 12/2000 | Lin |
| 6,292,750 | B1 | 9/2001 | Lin |
| 6,409,687 | B1 | 6/2002 | Foxlin |
| 6,417,802 | B1 | 7/2002 | Diesel |
| 6,496,778 | B1 | 12/2002 | Lin |
| 6,593,885 | B2 | 7/2003 | Wisherd et al. |
| 6,630,904 | B2 | 10/2003 | Gustafson et al. |
| 6,683,568 | B1 | 1/2004 | James et al. |
| 6,697,736 | B2 | 2/2004 | Lin |
| 6,721,657 | B2 | 4/2004 | Ford et al. |
| 6,750,816 | B1 | 6/2004 | Kunysz |
| 7,143,004 | B2 | 11/2006 | Townsend et al. |
| 7,193,559 | B2 | 3/2007 | Ford et al. |
| 7,236,091 | B2 | 6/2007 | Kiang et al. |
| 7,295,925 | B2 * | 11/2007 | Breed et al. ................... 701/301 |
| 7,409,290 | B2 | 8/2008 | Lin |
| 7,443,342 | B2 | 10/2008 | Shirai et al. |

(Continued)

OTHER PUBLICATIONS

"GPS/INS Generalized Evaluation Tool (GIGET) for the Design and Testing of Integrated Navigation Systems," Jennifer Denise Gautier, Stanford University, Jun. 2003.

(Continued)

*Primary Examiner* — Dao Phan
(74) *Attorney, Agent, or Firm* — Schmeiser, Olsen & Watts LLP

(57) ABSTRACT

An RF position tracking system for wirelessly tracking the three dimensional position of a device that transmits a radio signal. The device has an antenna and at least one inertial sensor. The system uses a plurality of receiver antennas to receive the device's radio signal at each antenna. The device also incorporates an inertial sensor to improve position stability by allowing the system to compare position data from radio signals to data provided by the inertial sensor.

13 Claims, 7 Drawing Sheets

(56) References Cited

U.S. PATENT DOCUMENTS

| | | | |
|---|---|---|---|
| 7,533,569 | B2 | 5/2009 | Sheynblat |
| 7,646,330 | B2 | 1/2010 | Karr |
| 8,457,655 | B2 | 6/2013 | Zhang et al. |
| 2003/0053492 | A1 | 3/2003 | Matsunaga |
| 2004/0095907 | A1 | 5/2004 | Agee et al. |
| 2006/0061469 | A1* | 3/2006 | Jaeger et al. ............. 340/539.13 |
| 2006/0066485 | A1 | 3/2006 | Min |
| 2007/0060384 | A1 | 3/2007 | Dohta |
| 2008/0048913 | A1 | 2/2008 | Macias et al. |
| 2008/0204322 | A1 | 8/2008 | Oswald et al. |
| 2009/0149202 | A1* | 6/2009 | Hill et al. ................... 455/456.6 |
| 2010/0103989 | A1 | 4/2010 | Smith et al. |
| 2011/0187600 | A1 | 8/2011 | Landt |
| 2011/0210843 | A1 | 9/2011 | Kummetz |
| 2011/0241942 | A1 | 10/2011 | Hill |
| 2011/0256882 | A1 | 10/2011 | Markhovsky et al. |

OTHER PUBLICATIONS

"Real-time differential Carrier Phase GPS-Aided INS," Jay Farrell, tony Givargis, Matthew Barth, IEEE Transactions on control Systems Technology, vol. 8, No. 4, Jul. 2000.
"Integrated GPS/INS Navigation System Based on a Gyroscope-Free IMU," Edmundo A. Marques Filho, Helio Koiti Kuga, Atair Rios Neto, DINCON 2006, Brazilian Conference on Dynamic.
"Design and Performance of a Robust GPS/INS Attitude System for Automobile Applications," Santiago Alban, Stanford University, Jun. 2004.
J. Farrell & M. Barth, "The Global Positioning System & Inertial Navigation" pp. 245-252 (McGraw-Hill,1999).
M. Grewal, L Weill, A. Andrews, "Global Positioning Systems, Inertial Navigation, and Integration" pp. 252-256 (John Wiley and Sons, 2001).
Jianchen Gao, "Development of a Precise GPS/INS/On-Board Vehicle Sensors Integrated Vehicular Positioning System" UCGE Reports No. 20255, § 4.2 (Jun. 2007).
Yong Yang, "Tightly Coupled MEMS INS/GPS Integration with INS Aided Receiver Tracking Loops" UCGE Reports No. 20270, §§ 1, 3.1 & 3.7 (Jun. 2008).
Christopher L. Goodall, "Improving Usability of Low-Cost INS/GPS Navigation Systems using Intelligent Techniques" UCGE Reports No. 20276, § 2.4 (Jan. 2009).
Debo Sun "Ultra-Tight GPS/Reduced IMU for Land Vehicle Navigation" UCGE Reports No. 20305, §§ 1.1.3, 1.1.4 & 2.4 (Mar. 2010).
Hongxing Suna, Jianhong Fua, Xiuxiao Yuana, Weiming Tangb, "Analysis of the Kalman Filter With Different INS Error Models for GPS/INS Integration in Aerial Remote Sensing Applications" The International Archives of the Photogrammetry, Remote Sensing and Spatial Information Sciences. vol. XXXVII. Part B5. Beijing (2008). (Analysis of the Kalman filter with different INS error models).
"Integration of a GPS aided Strapdown Inertial Navigation System for Land Vehicles," Adrian Schumacher, KTH Electrical Engineering, XR-EE-SB, Ch.3 §3.1 2006:006. (Integration approaches: discusses the coupling approaches of GPS and INS (Section 3.1)).
"Integration of Inertial Navigation System and Global Positioning System Using Kalman Filtering," Vikas Kumar N. , Department of Aerospace Engineering Indian Institute of Technology, Bombay Mumbai, §3.3 (Jul. 2004). (Discussion of integrating GPS and INS with a Kalman filter in Section 3.3).
"GPS/INS Generalized Evaluation Tool (GIGET) for the Design and Testing of Integrated Navigation Systems," Jennifer Denise Gautier, Stanford University, §§ 1.1.3.1, 4.2.3.3, 4.2.4 & 4.2.5 (Jun. 2003).
"Real-time differential Carrier Phase GPS-Aided INS," Jay Farrell, tony Givargis, Matthew Barth, IEEE Transactions on control Systems Technology, vol. 8, No. 4, §A (methodology) (Jul. 2000).
"Integrated GPS/INS Navigation System Based on a Gyroscope-Free IMU," Edmundo A. Marques Filho, Helio Koiti Kuga, Atair Rios Neto, DINCON Brazilian Conference on Dynamics, Control and Their Applications, §3.3 (2006). (Kalman filter design).
"Design and Performance of a Robust GPS/INS Attitude System for Automobile Applications," Santiago Alban, Stanford University, (Jun. 2004).
"The Global Positioning System & Inertial Navigation," J. Farrell & M. Barth, McGraw-Hill, 1999.
"Global Positioning Systems, Inertial Navigation, and Integration," M. Grewal, L. Weill, A. Andrews, John Wiley and Sons, 2001.
"Development of a Precise GPS/INS/On-Board Vehicle Sensors Integrated Vehicular Positioning System," Jianchen Gao, UCGE Reports No. 20255, Jun. 2007.
"Tightly Coupled MEMS INS/GPS Integration with INS Aided Receiver Tracking Loops," Yong Yang, UCGE Reports No. 20270, Jun. 2008.
"Improving Usability of Low-Cost INS/GPS Navigation Systems using Intelligent Techniques," Christopher L. Goodall, UCGE Reports No. 20276, Jan. 2009.
"Ultra-Tight GPS/Reduced IMU for Land Vehicle Navigation," Debo Sun, UCGE Reports No. 20305, Mar. 2010.
"Integration of a GPS aided Strapdown Inertial Navigation System for Land Vehicles," Adrian Schumacher, KTH Electrical Engineering, XR-EE-SB 2006:006.
Schmidt & Phillips, "INS/GPS Integration Architectures", NATO RTO Lecture Seriers, First Presented Oct. 20-21, 2003; 24 pages.
International Search Report & Written Opinion in international patent application PCT/US12/64860, mailed on Feb. 28, 2013; 8 pages.

* cited by examiner

POSITION TRACKING SYSTEM AND METHOD USING RADIO SIGNALS AND INERTIAL SENSING

This Patent Application claims the benefit of U.S. Provisional Patent Application No. 61/413,026 filed on Nov. 12, 2010, entitled, "POSITION TRACKING SYSTEM AND METHODS USING RADIO SIGNALS AND INERTIAL SENSING," the contents and teachings of which are hereby incorporated by reference in their entirety.

TECHNICAL FIELD

The present disclosure relates generally to position tracking of mobile devices. More particularly, the present disclosure relates to a position tracking system and method using radio signals and inertial sensing.

RELATED ART

In a Global Positioning System (GPS), satellites orbiting the earth transmit signals to passive receivers on the ground. The receivers only receive signals, but they do not transmit signals. One limitation of GPS receivers is that they require an unobstructed view of the sky. As a result, GPS receivers typically are better suited for outdoor use and in areas away from tall buildings or heavy tree cover. A further limitation of GPS location devices is their dependence on an accurate external time reference.

In a GPS system, each of many GPS satellite transmits a signal that includes data to indicate the satellite's location and current time. GPS systems use two carrier frequencies (L1 and L2) for transmitting information, including satellite location, ionospheric propagation delays, offsets between satellite clock time and true GPS time. Additionally, GPS measurements are determined from pseudoranges, which are range measurements biased by receiver and satellite clock errors. The GPS satellites are all synchronized to transmit repeating signals at the same time. Because each satellite is located at a different distance from a receiver on the ground, transmitted signals arrive at the GPS receiver at slightly different times. The receiver uses the different receipt times for various signals to calculate the receiver's location in three dimensions.

U.S. Pat. Nos. 5,953,683; 7,143,004; and 7,533,569 describe sourceless orientation sensors. For example, U.S. Pat. No. 7,533,569 discloses a method of measuring positional changes of an object by using multiple accelerometers. U.S. Pat. No. 7,236,091 describes a hybrid RF/inertial position tracking system having a "wide resolution" mode for general position tracking, and a "high-resolution" mode that employs kinematic models. In this system, the high-resolution position accuracy is considered to be within the order of meters. U.S. Pat. Nos. 7,409,290; 6,167,347; 6,292,750; 6,417,802; 6,496,778; 5,923,286; 6,630,904; 6,721,657; 7,193,559; and 6,697,736 describe GPS-aided positioning and navigation methods. For example, U.S. Pat. No. 7,409,290 altitude and heading information are used to aid the GPS positioning when satellite signals are not available.

Unlike GPS, where transmission time is measured from a satellite to a mobile device or receiver, high-accuracy systems that track mobile devices in three dimensional space measure the time that a signal arrives from the mobile device to a system's connected (either wired or wireless) antennae. These systems do not have the bias errors that GPS has. These time-based, high-accuracy RF positioning systems that use networked antennae for comparing signal time of arrival or difference of arrival measurements consist of receiver hardware having multiple receiver antennae and transmitter hardware having one or more transmitter antennae. To track a single transmitter or transmitter antenna in three dimensions, at least four receiver antennae are required. Similarly, for tracking in two dimensions, at least three receiver antennae are required.

Also unlike GPS, where the tracking calculation is performed in the mobile device, the RF system's receiver antennae provide the reference frame in which the mobile antennae are tracked. More receiver antennae provide better coverage and more accuracy, but do so with increased complexity and cost. The receiver antennae must be distinct, fixed, and have a known location in space. More transmitter antennae attached to or embedded in a tracked object allow the object's orientation to be calculated based on geometric principles. For example, two transmitter antennae, separated by a distance D, yield a pointer, since the two transmitter antennae form a line with known direction. Three transmitter antennae provide enough information to calculate three dimensional position and orientation. The system can be reversed, with the receiver antennae being tracked and the transmitter antennae providing the reference frame.

The major source of error in RF positioning systems is signal propagation errors, such as multipath. While many methods have attempted to mitigate this problem (antennae diversity, spread spectrum), signal propagation errors are very difficult to totally eliminate. A sourceless navigation system does not have these issues, but does have its own set of problems. Sourceless navigation systems are typically based on inertial sensors, which can consist of accelerometers and gyroscopes, as well as magnetic sensors. The use of small inertial sensors, like gyroscopes and accelerometers, has become commonplace in position tracking. Inertial sensors overcome problems like line-of-sight restrictions that plague tracking systems. Unfortunately, commercial, low-cost devices have drift, bias and scale factor errors and orientation motion and positional motion need to be algorithmically separated.

A positioning solution is obtained by numerically solving Newton's equations of motion using measurements of forces and rotation rates obtained from the inertial sensors. The magnetic sensor helps to define azimuth based on the earth's magnetic field. The accelerometer, gyroscope, and magnetic sensor, and various combinations thereof, together with the associated hardware and electronics comprise the inertial/magnetic devices subsystem (IMDS).

Angular orientation may be determined by integrating the output from angular rate sensors. A relatively small offset error on the gyroscope signal will introduce large integration errors. Accelerometers measure the vector sum of acceleration of the sensor and the gravitational acceleration (g). In most situations, g is dominant, thus providing inclination information that can be used to correct the drifted orientation estimate from gyroscopes. The principles for measuring orientation of a moving body segment fusing gyroscopes and accelerometers in a Kalman filter have been described in H. J. Luinge, *Inertial Sensing of Human Movement* (Ph.D. Thesis, 2002), and is incorporated by reference herein in its entirety. The magnetic sensor is sensitive to the earth's magnetic field and it gives information about the heading direction in order to correct drift of the gyroscope about the vertical axis. Methods for integrating these devices are described in E. R. Bachman, *Inertial and Magnetic Tracking of Limb Segment Orientation for Inserting Humans Into Synthetic Environments* (Ph.D. Thesis 2000), and E. Foxlin, *Inertial Head-Tracker Sensor Fusion by a Complementary Separate-Bias Kalman*

Filter Proc. of VRAIS '96, 185-94 (1996), both incorporated in their entireties by reference herein.

These Kalman filter implementations use accelerometers and magnetic sensors for low frequency components of the orientation and use gyroscopes to measure faster changes in orientation. Finally, an accelerometer-only based position and orientation tracker is disclosed in "Design and Error Analysis of Accelerometer-Based Inertial Navigation Systems," by Chin-Woo Tan Sungsu Park for the California Partners for Advanced Transit and Highways (PATH).

Methods for integrating similar IMDS components with GPS, acoustic, optical and magnetic tracking systems are known in the art. Some examples include "Robust Dynamic Orientation Sensing Using Accelerometers: Model-based Methods for Head Tracking in AR", by Matthew Stuart Keir, "Accelerometer-based Orientation Sensing for Head Tracking in AR & Robotics," by Matthew S. Keir, et al, "Using Gravity to Estimate Accelerometer Orientation, by David Mizell, "Setting up the MMA7660FC to do Orientation Detection," Freescale Semiconductor AN3840, "3D Orientation Tracking Based on Unscented Kalman Filtering of Accelerometer and Magnetometer Data," Benoit Huyghea et al., "Inertial and Magnetic Sensing of Human Movement near Ferromagnetic Materials," Daniel Roetenberg et al., "An Extended Kalman Filter for Quaternion-Based Orientation Estimation Using MARG Sensors," Joao Luis Marins et al., "An Improved Quaternion-Based Filtering Algorithm for Real-Time Tracking of Human Limb Segment Motions using Sourceless Sensors," Eric Bachmann et al., and are incorporated by reference herein in their entireties. In addition to these patents, the general methods for incorporating GPS and sourceless sensors are described in "The Global Positioning System & Inertial Navigation," by J. Farrell and M. Barth, (McGraw-Hill 1999); "Global Positioning Systems, Inertial Navigation and Integration," by M. Grewal, L. Weill, and A. Andrew, (John Wiley and Sons 2001); and "Introduction to Random Signals and Applied Kalman Filtering," by R. Brown and P. Hwang (John Wiley & Sons 1983). These references are also incorporated by reference in their entireties.

SUMMARY

No examples exist of RF-based position tracking systems that use inertial devices in a tracked mobile device to increase stability of the mobile device's RF signals received at the system's antennas. Therefore, what is needed is an RF position tracking system that tracks the position of one or more wireless mobile devices in two or three dimensions, improves on the limitations of GPS systems, and effectively integrates inertial sensing information in a combined system that allows the user to obtain a more stabilized and accurate position solution.

It is an object of the invention to provide a position tracking system that avoids the satellite and receiver clock errors of GPS systems.

It is also an object of the invention to provide a position tracking system capable of tracking the location of a transmitter in two or three dimensions.

It is also an object of the invention to provide a system that reduces the signal propagation errors of RF position tracking systems.

It is also an object of the invention to provide a system that reduces the drift, bias, and scale factor errors of sourceless navigation systems.

It is also an object of the invention to integrate an inertial/magnetic subsystem (IMDS) in a mobile device to better perform tracking by increasing stability of the system's received RF signals.

It is also an object of the invention to integrate an RF positioning system with an inertial/magnetic devices subsystem (IMDS) to provide long-term position stability and accuracy, even when the RF positioning system experiences temporary loss of signal.

It is also an object of the invention to use Kalman filter implementations in a RF system having accelerometers, magnetic sensors, and/or gyroscopes to measure faster changes in orientation.

It is also an object of the invention to use inertial sensors to reduce battery consumption allowing the device to transmit its radio signal only when it is moving.

It is also an object of the invention to use inertial sensors for constant tracking between the device and the system to maintain absolute position monitoring.

The present invention relates to RF position tracking system that tracks, in two or three dimensions, one or more wireless mobile device(s). The disclosure features utilizing an inertial/magnetic subsystem (IMDS) integrated in the mobile device to better perform tracking by adding stability to the system's RF signals received at the system's receiver(s). As RF signals from the mobile device are received at the system receiver, inertial information is also received that helps the system screen interference and multipath by weighting the RF data to best match the inertial data provided by the IMDS. The combined system allows a user to obtain a more stabilized/accurate position solution.

One embodiment of the invention is a system for wirelessly tracking the physical position of an object. The system has at least one radio frequency (RF) device having an antenna and at least one inertial sensor. The RF device is configured to emit a radio signal. The system has at least three receiver antennae that are each configured to receive a radio signal emitted by the device and transmit that signal to a receiver. The system also has a receiver in communication with the three or more receiver antennae. The receiver is configured to receive the radio signal from each receiver antenna and is further configured to communicate data to a data processor. Another embodiment comprises a positioning and/or navigation method and system thereof, in which the acceleration and/or velocity and/or position and/or heading from an inertial/magnetic navigation subsystem is/are used to supplement the carrier phase tracking of the RF positioning system signals, so as to enhance the performance of the RF positioning system during signal corruption or loss.

In another embodiment, a positioning and navigation system receives the acceleration, velocity, position, and/or heading measurements from an inertial/magnetic navigation subsystem. The inertial sensor measurement(s) is/are fused in a Kalman filter to supplement the carrier phase tracking of the RF positioning system signals, so as to enhance the performance of the RF positioning system during signal corruption or loss.

In another embodiment, the present invention provides an automatic power up/power down method that relies on the inertial/magnetic devices subsystem (IMDS). When the IMDS has detected no motion for a period of time, the RF positioning system is powered to a low power state. When motion resumes, the RF positioning system is returned to a full power state. In this way extended battery life may be achieved.

A method of tracking an object having an inertial sensor and capable of transmitting an RF signal includes each one of at least three antennae receiving an RF signal transmitted from an object to be tracked. The antennae receive an inertial signal from an inertial sensor integrated into or fixed onto the object. The system processes the RF signal and the inertial signal to determine the position of the object.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
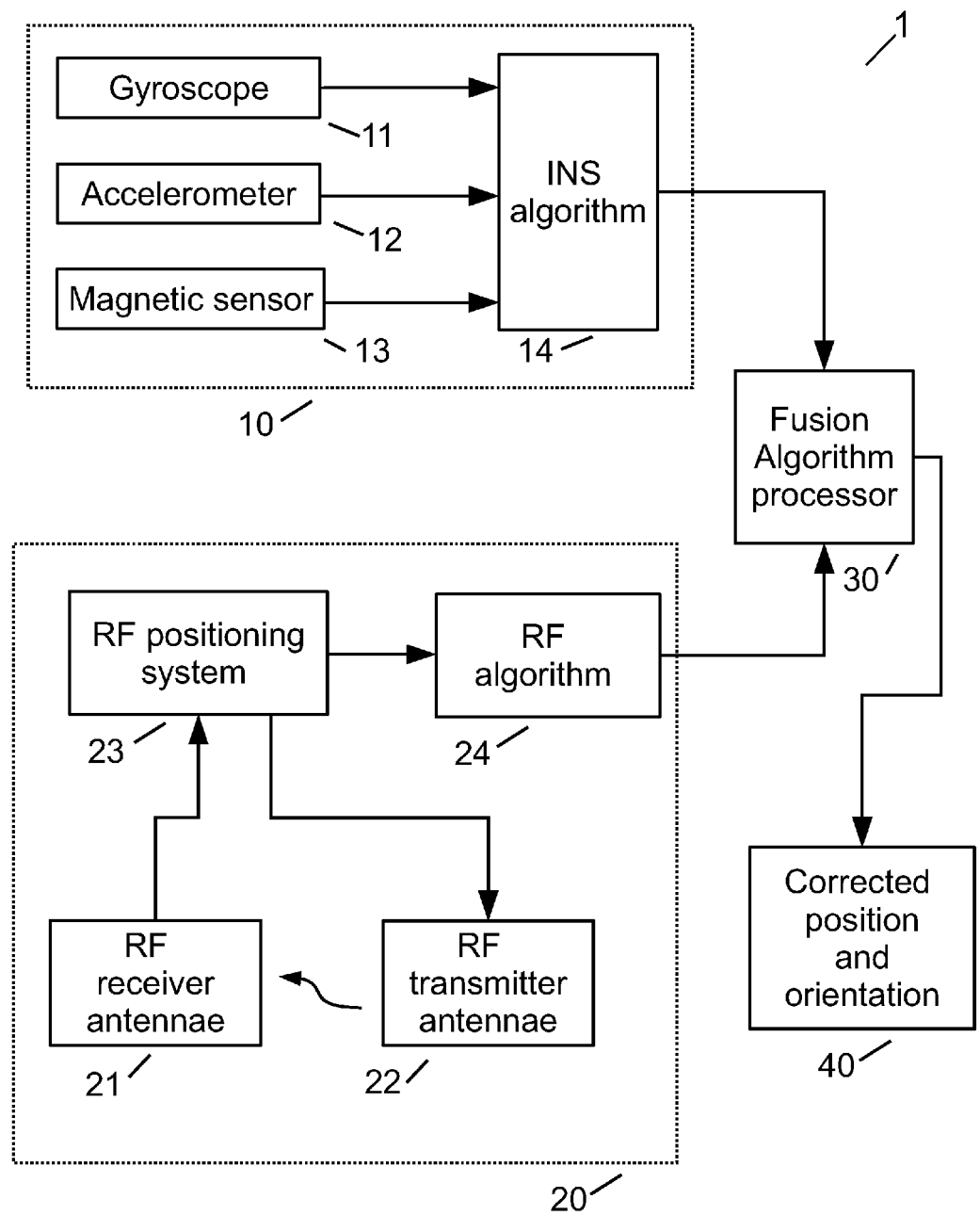
FIG. 1 is a block diagram illustrating an embodiment of a positioning and navigation system in which RF-based positioning system measurements and an inertial devices subsystem measurement are blended.

FIG. 1 illustrates one embodiment of a positioning and navigation system 1. The positioning and navigation system 1 includes inertial/magnetic devices subsystem 10 (IMDS), an RF tracking system 20, a fusion algorithm processor 30 and a corrected position and orientation output interface 40. The inertial/magnetic devices subsystem 10 (IMDS) may include gyroscopes 11, and/or accelerometers 12 and/or magnetic sensors 13, with their accompanying signal conditioning methods and algorithms processor 14. INS algorithm block 14 may be based on Kalman filtering techniques. The RF tracking system 20 comprises a set of RF receiving antennae 21, a set of RF transmitting antennae 22, RF system hardware 23, a tracking processor 24, a fusion algorithm processor 30, and a corrected position and orientation output interface 40.

The gyroscope 11 may be based on fiber optics, ring lasers, vibrating masses, micro machined devices (MEMS technology), or other technology. A typical three-axis MEMS-based gyroscope 11 is the Analog Devices ADIS 16354, a high precision tri-axis inertial sensor. Multiple, single-axis gyroscopes could also be used.

The accelerometer 12 may be piezo-electric, capacitive, strain, optical, surface wave, micro-machined (MEMS technology) or one of the many other types of technologies used for measuring acceleration. A typical threeaxis MEMS accelerometer 12 is the Analog Devices ADXL325, a threeaxis analog accelerometer. The magnetic sensor (magnetometer) 13 can be a Hall effect, GMR, moving coil, magneto resistive, SQUID, spin dependent tunneling, proton precession, fluxgate, or other type of technology. An example of a threeaxis magneto resistive magnetometer is the Honeywell HMC1043 threeaxis magnetic sensor.

Finally, IMDS subsystem 10 may also consist of a complete integrated solution, as exemplified by the Razor IMU for Sparkfun Electronics, a 9 degree-of-freedom system that incorporates three devices—an InvenSense ITG-3200 (triple-axis gyro), Analog Devices ADXL345 (triple-axis accelerometer), and a Honeywell HMC5883L (triple-axis magnetometer). The outputs of all sensors 11, 12, 13 are processed by an on-board Atmel ATmega328 RISC processor 14 and the navigation solution, which is represented by the corrected position and orientation block 40 is output over a serial interface.

The RF tracking system 20 includes a set of RF receiving antennae 21, a set of RF transmitting antennae 22, RF system hardware 23 and a tracking processor 24. The RF receiving antennae 21 and the transmitter antennae 22 can be a dipole, patch or other antennae appropriate for the particular wavelength. Various combinations of antennae may also be used. The RF system hardware 23 includes RF components that are explained more fully in the description of FIG. 2. The processed results from RF system hardware 23 are converted to a position and orientation solution by tracking processor 24. Tracking processor 24 may include a DSP, embedded processor or other such processing system that runs an algorithm to compute the position and orientation from the processed results.

Figure 2:
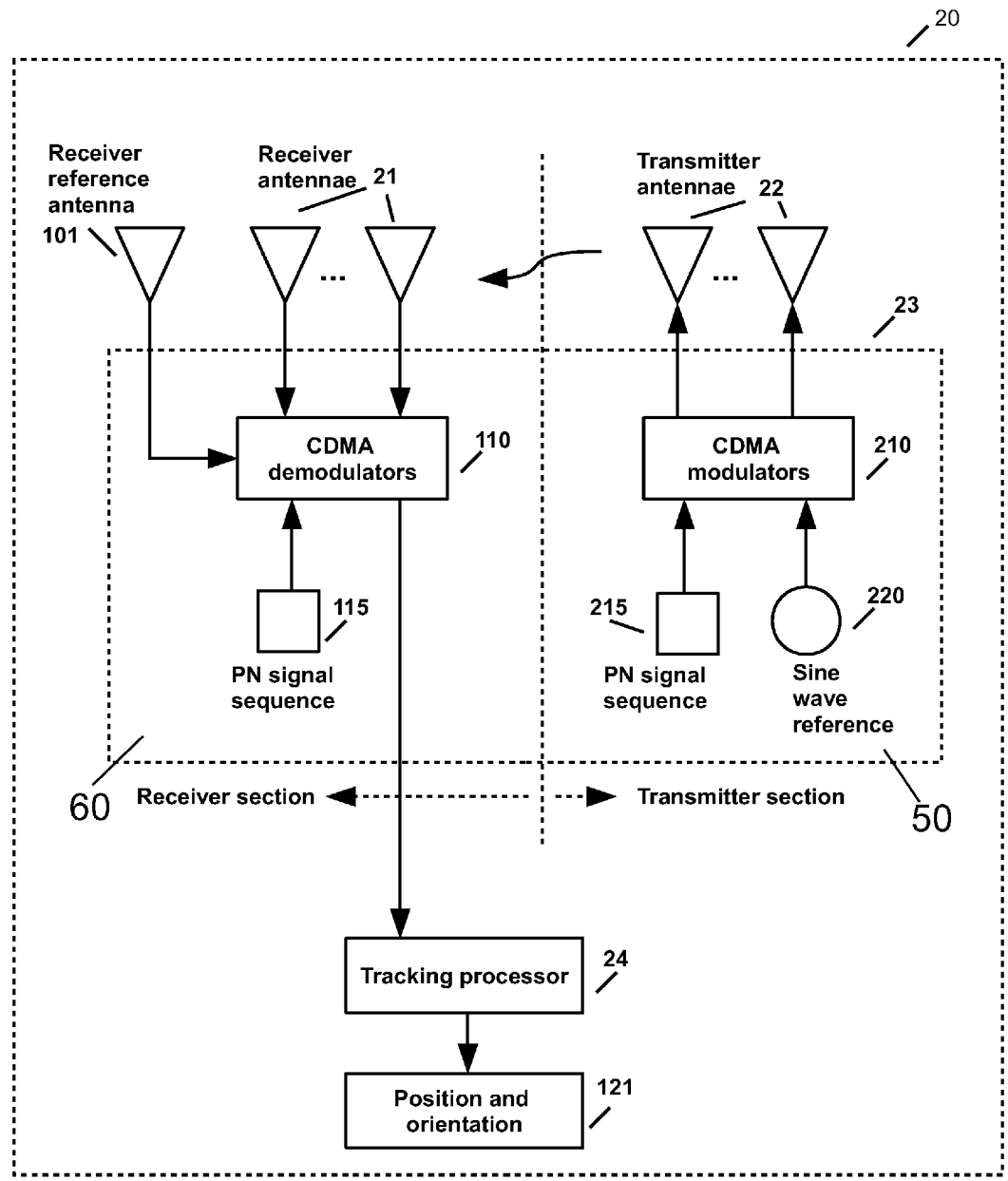
FIG. 2 is a block diagram illustrating an embodiment of a positioning and navigation system in which RF signal measurements are used to determine the position of a set of transmitter antennae with respect to a set of receiving antennae.

As shown in FIG. 2, the RF tracking system 20 includes multiple receiver antennae 21, one or more transmitter antennae 22 and transmitter hardware, and RF system hardware 23. RF system hardware 23 may consist of amplifiers, limiters, filters, signal sources, demodulators, modulators, and other devices. These devices may be separate entities, may be embedded mathematically in a DSP or processor, or may be a combination of separate and embedded devices.

The transmitter section 50 consists of a sine wave 220 modulated with a pseudo-random noise sequence 215 by CDMA modulator 210. This type of modulation may be of the type found in cell phones and other communication devices. The signal is amplified (not shown) and sent to transmitter antenna 22.

In the receiver section 60, the signal is received by the receiver antennae 21 and receiver reference antenna 101. Receiver antenna 101 is the reference from which the time difference of arrival is measured. The receiver antennae receive the transmitted signal and forward these signals to the receiver circuitry 110 for demodulation using another pseudo-random noise (PN) sequence 115. PN sequence 115 may be identical to PN sequence 215, although not synchronized to it in time (in other words, the starting points are not the same). This means that both sequences contain the identical pseudo-random data, but that the data is read from different starting positions. CDMA demodulators 110 retrieve the transmitted sine wave from sine wave generator 220. Within the tracking processor 24, which may be a DSP (or microprocessor), the recovered reference sine wave is shifted by 90° so that when the other signals are multiplied by it and then integrated, the reference sine wave provides a measure of phase shift between the reference and the other received signals (i.e., differential phase). The differential phases are used by the position and orientation algorithm in the tracking processor 24 to determine position and orientation 121 of a tracked object.

Tracking a single transmitter device or transmitter antenna in three dimensions requires at least four receiver antennae 21; tracking in two dimensions requires at least three receiver antennae 21. The receiver antennae 21 provide the reference frame in which the transmitter antennae are tracked. More receiver antennae 21 provide better coverage and more accuracy, but do so with increased complexity and cost. The receiver antennae 21 must be distinct and their respective locations known in space. More transmitter antennae 21 attached to or embedded in a tracked object allow the object's orientation to be calculated based on geometric principles.

For example, two transmitter antennae 22, separated by a distance D, yield a pointer, since the two transmitter antennae 22 form a line with known direction. Three transmitter antennae 22 provide enough information to calculate a three-dimensional orientation. The system 1 can be reversed, with the receiver antennae 21 being tracked and the transmitter antennae 22 providing the reference frame. Recent art can be found in "Communication Systems Engineering," by Proakis and Salehi, and is incorporated herein. Many variations possible to achieve the same functionality and many of the noted components can be part of an integrated DSP. For example, a DSP might generate sine wave 220 and PN sequence 215. Discrete multipliers and integrators might be implemented in hardware instead of firmware.

The inertial/magnetic devices subsystem 10 (IMDS) provides inertial and magnetic field measurements including body angular rates, specific forces, and information on the Earth's magnetic field direction which are sent to the fusion algorithm processor 30 for minimizing RF tracking system errors during loss or corruption of RF signal. In one embodiment, the position and orientation of the transmitter antennae 22 are calculated in RF algorithm block 24.

The position and orientation algorithm is based on solving the underlying range equations. In this phase-based system, the phase is used to measure range. The operating wavelengths of the RF tracking system provide ambiguous phase measurements because phase measurements are modulo $2\pi$ numbers. Without further information, only the fractional part of the phase can be determined, making the range incorrect. Equations (1)-(3) illustrate the phase to range measurement relationship. $\rho_n$ is the range, $\lambda$ is the wavelength (for a fixed frequency), $\Phi_n$ is the measured phase and $k_n$ is the integer portion of the phase. Methods exist to determine the additional integer number of wavelengths corresponding to the actual range, but it should be noted that problems due to multipath, line-of-sight issues, and other problems can lead to loss of tracking.

$$\rho_1 = \lambda\left(\frac{\phi_1}{2\pi} + k_1\right), \quad (1)$$

$$\rho_2 = \lambda\left(\frac{\phi_2}{2\pi} + k_2\right), \quad (2)$$

$$\vdots$$

$$\rho_n = \lambda\left(\frac{\phi_n}{2\pi} + k_n\right), \quad (3)$$

One way to measure the phases is against a fixed reference phase. By measuring the transmitter signal's phase differences recorded at two receiver antennae the distance is calculated. In the following equations, values $\rho1$-$\rho4$ represent distances between the receiver antennae positions and the transmitter position and are determined by the phases. Receiver positions are denoted as $\text{rcvr\_pos}_{receiver\ number,position\ coordinate}$, and are fixed, known quantities. Position coordinate $x_{1,2,3}$ represent x,y,z, respectively.

$$p1 = \sqrt{(\text{rcvr\_pos}_{1,1}-x_1)^2 + (\text{rcvr\_pos}_{1,2}-x_2)^2 + (\text{rcvr\_pos}_{1,3}-x_3)^2} \quad (4)$$

$$p2 = \sqrt{(\text{rcvr\_pos}_{2,1}-x_1)^2 + (\text{rcvr\_pos}_{2,2}-x_2)^2 + (\text{rcvr\_pos}_{2,3}-x_3)^2} \quad (5)$$

$$p3 = \sqrt{(\text{rcvr\_pos}_{3,1}-x_1)^2 + (\text{rcvr\_pos}_{3,2}-x_2)^2 + (\text{rcvr\_pos}_{3,3}-x_3)^2} \quad (6)$$

$$p4 = \sqrt{(\text{rcvr\_pos}_{4,1}-x_1)^2 + (\text{rcvr\_pos}_{4,2}-x_2)^2 + (\text{rcvr\_pos}_{4,3}-x_3)^2} \quad (7)$$

Phase differences such as formed from manipulating equations (4)-(7) into differences $\rho4$-$\rho1$, $\rho3$-$\rho1$, and $\rho2$-$\rho1$ provide the same information for determining position while allowing one of the received signals to act as a common reference.

These four equations are used to solve for x1, x2 and x3, in the RF algorithm 24, which represents the x,y,z, position of the transmitter, respectively. This can be solved in a least squares algorithm, such as Levenberg-Marquardt or in a Kalman filter, as noted in the references.

There are many ways to combine the various data streams. According to Gautier in "GPS/INS GENERALIZED EVALUATION TOOL (GIGET) FOR THE DESIGN AND TESTING OF INTEGRATED NAVIGATION SYSTEMS," a loosely-coupled system calculates position using the RF solution only. The IMDS computes position, velocity and attitude from the raw inertial sensor measurements and uses the RF solution to fix the IMDS errors. A benefit of a loosely coupled system is that the RF system can be treated as a "black box." In tightly-coupled systems, the kalman filter receives phase measurements of range. Ultra-tightly coupled system utilize contain feedback to the RF system itself. However, in "The Global Positioning system and Inertial Navigation," by Farrell and Barth, loosely-coupled is defined in a more general manner (reference section 7.2.2 and accompanying figures) and allows for some feedback mechanisms to exist. The ultra-tightly coupled method of Gautier is equivalent to Farrell and Barth's version of tightly coupled. For this reason, and because it is more general, the definition of coupling will be based on Farrell and Barth's description in what follows.

Referring to FIGS. 3-6, the fusion algorithm processor 30 is shown as a separate processor, which may again take the form of a DSP or microprocessor subsystem. Its job is to combine the inertial/magnetic devices subsystem 10 (IMDS) outputs with those of the RF tracking system algorithm 24 in what might be called an uncoupled form of fusion or unaided inertial solution. Methods of merging the data could require ad-hoc methods to prevent errors from becoming unbounded. Merging these data streams could be done in a Kalman filter. The Kalman filter provides corrected position and orientation outputs 40 by combining the two outputs which could arrive at the fusion processor 32 at different rates. It is also possible to combine algorithm processing 14, 30 and 24 into a single processor for all of the algorithms or to combine various portions as necessary.

This x,y,z position solution from RF algorithm 24 is incorporated into the fusion algorithm processor 30, which preferably consists of a linearized or extended Kalman filter. The Kalman filter 30 is a recursive filter that estimates the state of a dynamic system. It is commonly used in data fusion applications, among others. The Kalman filter 30 is used to combine, in an optimal manner, the RF tracking system 20 data with those of the IMDS subsystem 10. If the filter 30 detects short term divergence of the RF and IMDS subsystem, it weights the final solution towards the IMDS information and supplies a corrected position and orientation output 40.

Figure 3:
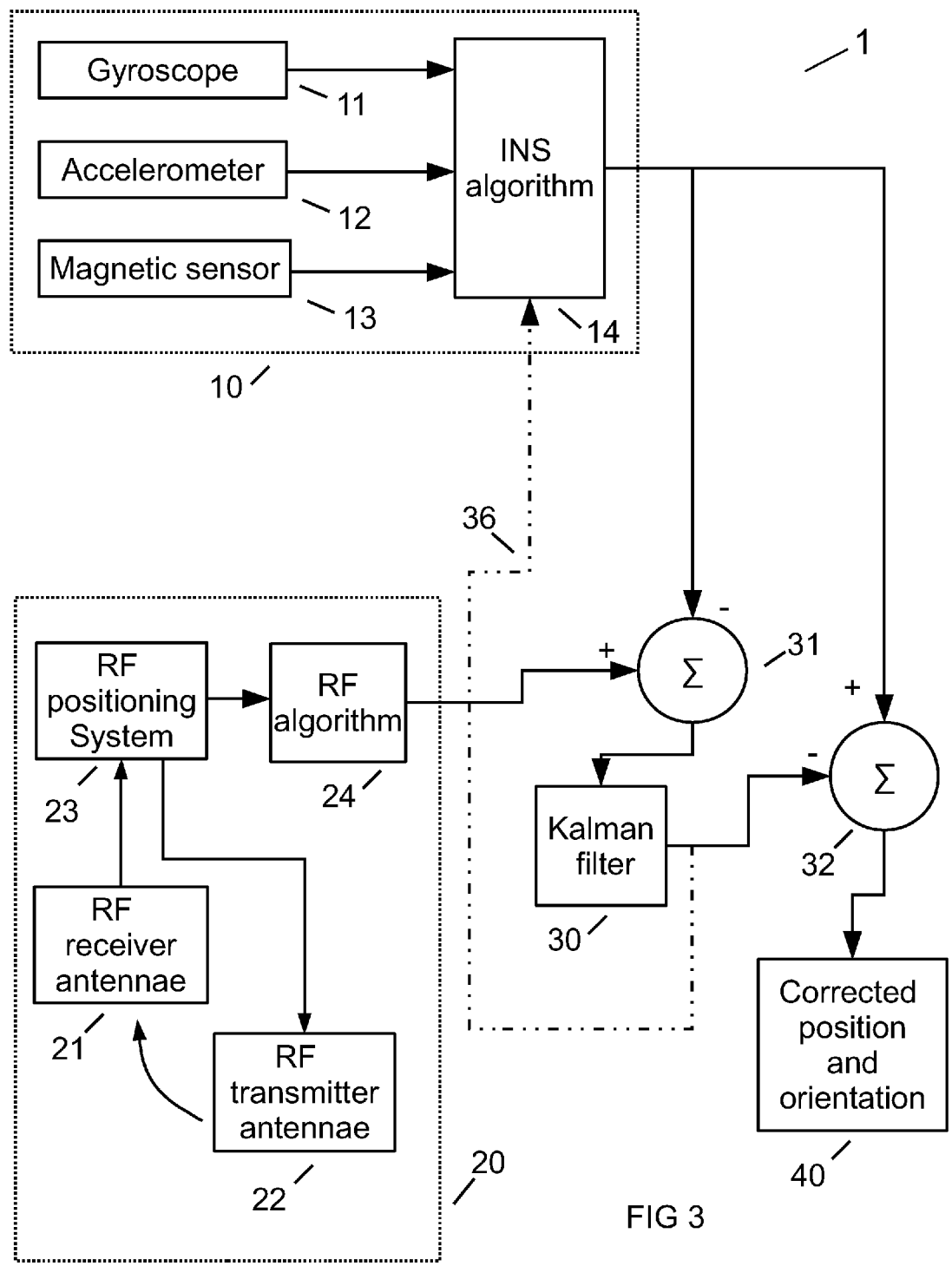
FIG. 3 is a block diagram showing an embodiment of a positioning and navigation system having a RF position-aided IMDS design.

FIG. 3 represents different approaches to the second embodiment of the system 1. When interface 36 is not included, the result is a linearized Kalman filtering approach. When it 36 is there, the result is an extended Kalman filter. Linearized Kalman filters are derived assuming a linearization was performed around the operating point of the filter. Extended Kalman filters utilize non-linear models. Both filters have pros and cons, such as implementation simplicity and speed of processing.

In this second embodiment, the fusion of RF tracking and inertial tracking is performed in a loosely coupled manner. In loosely-coupled fusion, a link 36 sends the error signal from the Kalman filter 30 is sent to the inertial sensing processor 14 to modify the IMDS 10 output. A feed-forward, complementary filter design, also known as a RF position aided IMDS design, is shown in FIG. 3. Many of the main blocks were already defined in FIG. 1. At the instant at which the GPS measurement is valid, the IMDS state is saved and used for comparison with the RF data. By driving the Kalman filter 30 with the error between the RF data and the IMDS data (output of block 31), it is valid to estimate the navigation error state based on a linearized system model. Second, since the filter is designed based on an error model, all model parameters can be properly defined in a stochastic sense. Third, the responsiveness of the navigation system is determined primarily by the update rate of the IMDS system 10 (assuming it has a faster update rate than the RF system) and the bandwidth of the inertial sensors 11, 12, 13. Fourth, because the Kalman filter 30 estimates slowly-varying error quantities, the system 1 can be a low-bandwidth system to attenuate any high-frequency error on the RF aiding signal. This error value is subtracted from the IMDS solution in block 32 to remove errors that occur over time in the IMDS system 10.

If link 36 is added, the INS algorithm 14 can be modified to take the error signal generated by Kalman filter 30 and modify the IMDS 10 output at the computation source. This can reduce offsets and biases that are common in inertial hardware 11, 12, and 13.

Figure 4:
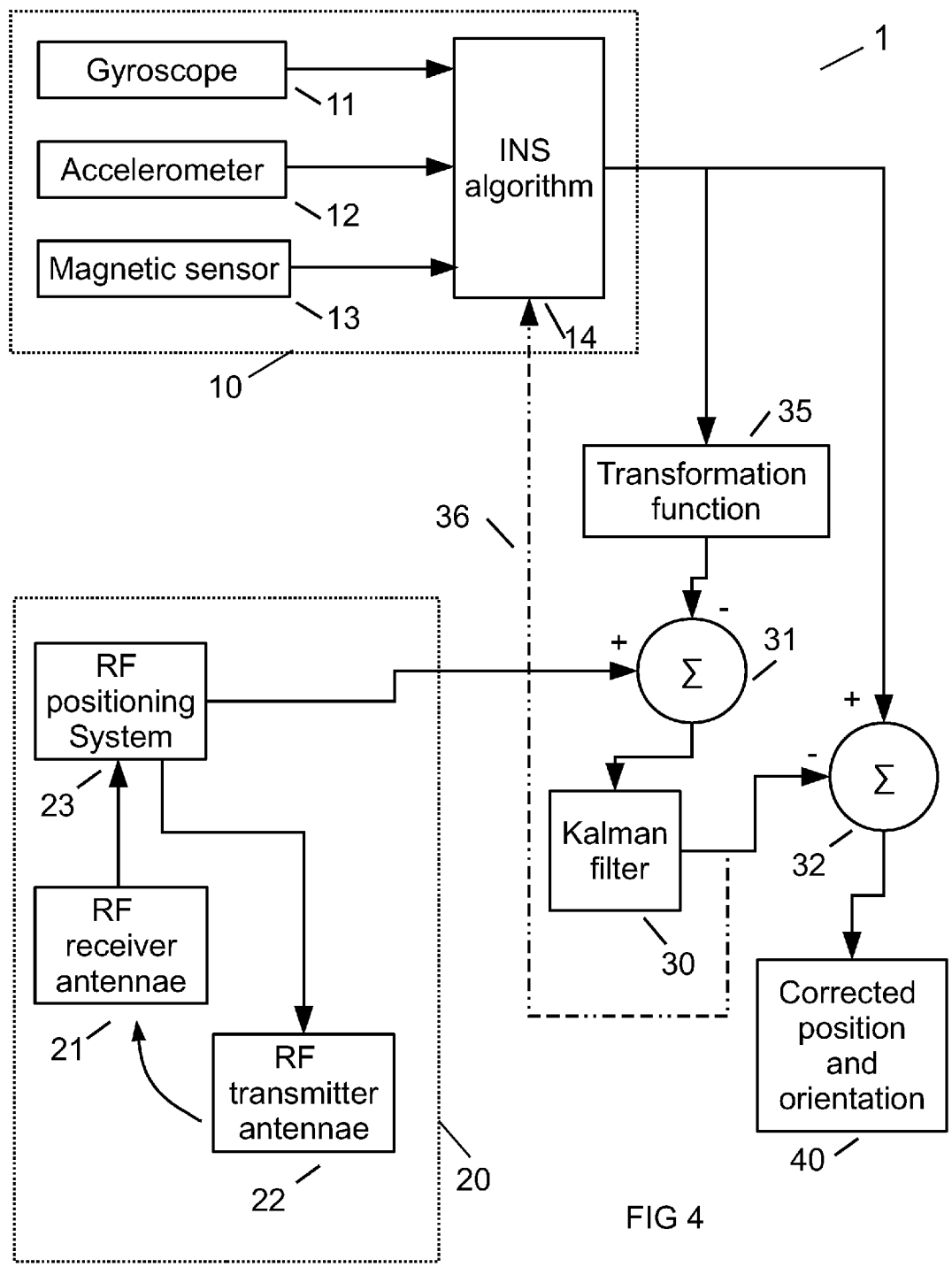
FIG. 4 is a block diagram showing an embodiment of a positioning and navigation system having a RF range-aided IMDS design.

In a third embodiment shown in FIG. 4, the fusion of RF tracking and inertial tracking is performed in a loosely-coupled manner. As noted above, loosely-coupled fusion is when link 36 sends the error signal from the Kalman filter 30 to the inertial sensing processor 14 to modify the IMDS 10 output. An example of a feed-forward, complementary filter design, also known as a RF range-aided IMDS design, is shown in FIG. 4. Many of the main blocks were already defined in FIGS. 1 and 3. The RF algorithm, however, is now incorporated into Kalman filter 30. Transformation block 35 takes the position solution from the IMDS system 10 and converts it back into range data. Range error is determined in block 31 by subtracting this ranged data from that obtained from RF positioning system 23. This error range data output of block 31 is now used by Kalman filter 30 to compute a position or position and orientation error solution, which in turn, is used to correct output 40 via block 32. This embodiment also provides a means to correct phase errors that occur due to multipath, line-of-sight issues, and other sources, since cycle slippage due to the phase being modulo $2\pi$ numbers can be corrected.

Figure 5:
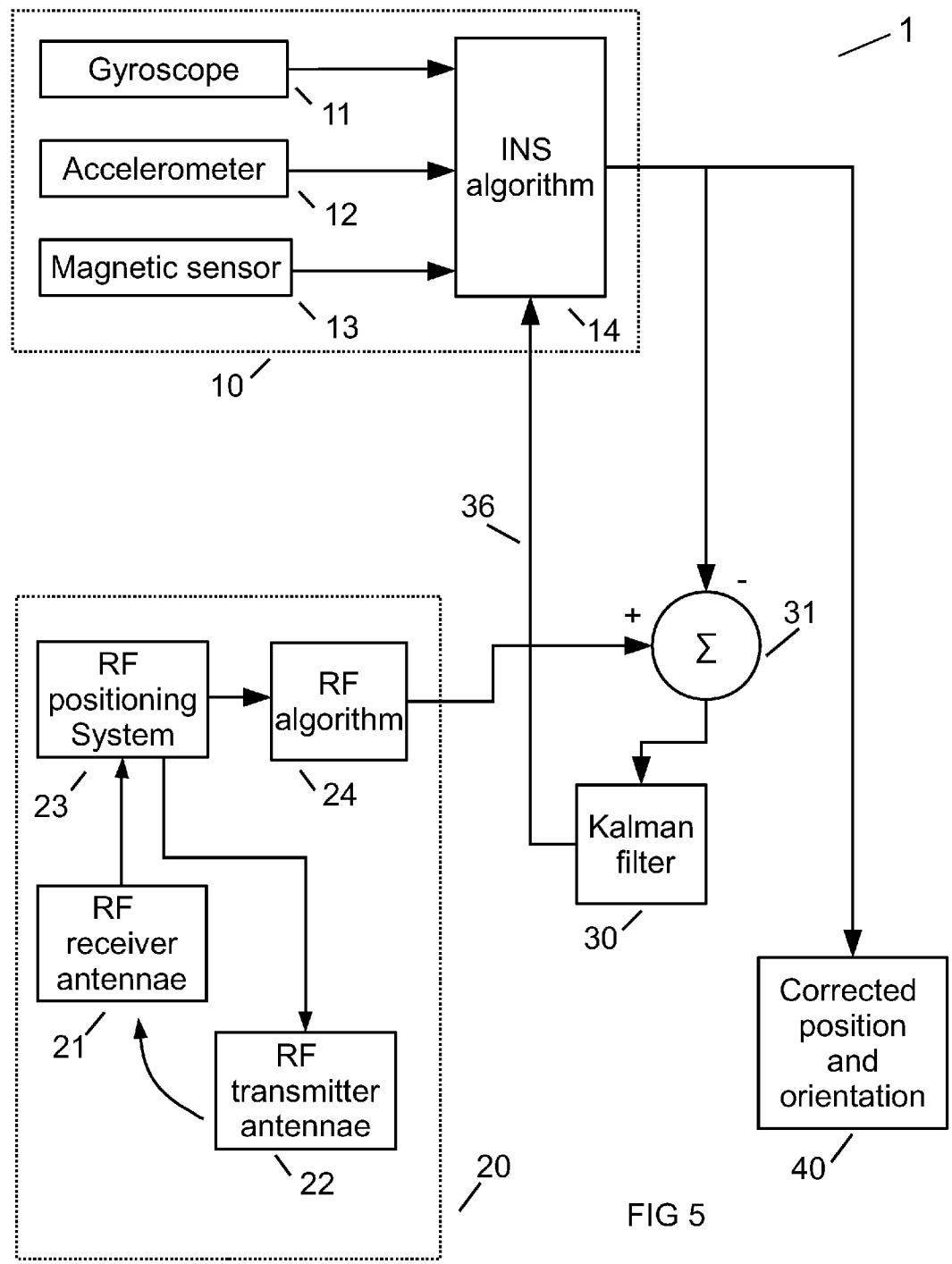
FIG. 5 is a block diagram showing another embodiment of a positioning and navigation system that implements feedback.

In an alternate embodiment shown in FIG. 5, if link 36 is added, the INS algorithm 14 can be modified to receive the error signal generated by Kalman filter 30 and modify the IMDS 10 output at the computation source 14. This can reduce offsets and biases that are common in inertial hardware 11, 12 and 13.

FIG. 5 shows another embodiment in which complementary filters may be designed for feedback implementation. In this embodiment, errors between the RF system 20 and the IMDS system 10 are produced by block 31. These errors are filtered by Kalman filter 30 to produce bias and drift compensation to the inertial components 11, 12 and 13.

Figure 6:
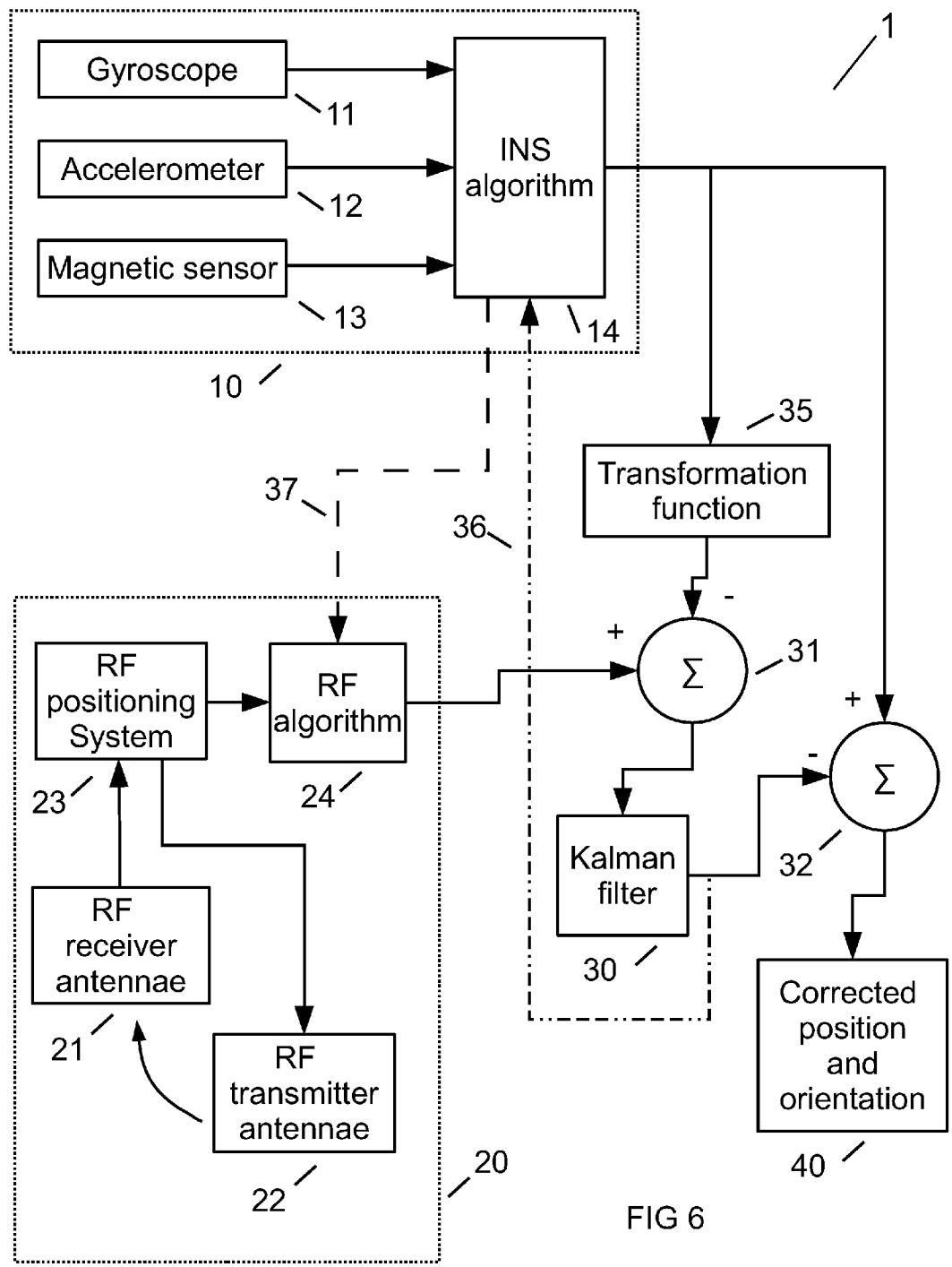
FIG. 6 is a block diagram showing an embodiment of a positioning and navigation system that incorporates acceleration and velocity data in a range-aided or position-aided IMDS design.

FIG. 6 shows another embodiment of the system 1 in which the fusion of RF tracking and inertial tracking is performed in a tightly-coupled manner. In tightly-coupled fusion, link 36 sends the error signal from the Kalman filter 30 to the inertial sensing processor 14 to modify the IMDS 10 output while interface 37 sends acceleration and velocity data to the RF algorithm 24. This embodiment has a feed-forward, complementary filter design, also known as a RF-aided IMDS design. This embodiment can be either position- or range-aided, as described previously. A difference in this embodiment is the addition of interface 37, which provides the RF algorithm 24 with acceleration and velocity data from the inertial hardware 11, 12, and/or 13. Interface 37 allows RF algorithm 24, which would preferably be a Kalman filter, to incorporate acceleration and velocity data into its model. This embodiment also provides a means to correct phase errors that occur due to multipath, line-of-sight issues, and other sources, since cycle slippage due to the phase being modulo $2\pi$ numbers, can be corrected.

An additional use for the accelerometers 12 is as a power-saving device. In this mode of operation, the accelerometer is monitored for periods of no acceleration (hence no velocity or positional changes). During these periods, the RF positioning system, especially the RF transmitters, can be put into a low or no power state. When movement resumes, which would cause an instantaneous acceleration to be measured, the RF transmitters could be powered up to resume RF tracking. Since the fusion algorithm processor 30 mediates this process, it would be able to keep track of the last computed position and orientation 40, and once acceleration is detected, apply corrections to the position and orientation based on the IMDS subsystem 10 measurements until the RF tracking system 20 comes back on line.

Depending on total system tracking requirements, including accuracy, cost limitations, or other constraints, one or more components of the inertial/magnetic devices subsystem 10 (IMDS) may or may not be present. Multiple units of each device 11, 12, and/or 13 may be used to sense various directional components. In a minimal embodiment, only one accelerometer 12 may be used to provide positional corrections over short periods of time. Also, while the fusion algorithm processor 30 is expected to run a Kalman filter, other methods for integrating the disparate measurements may be used.

Figure 7A:
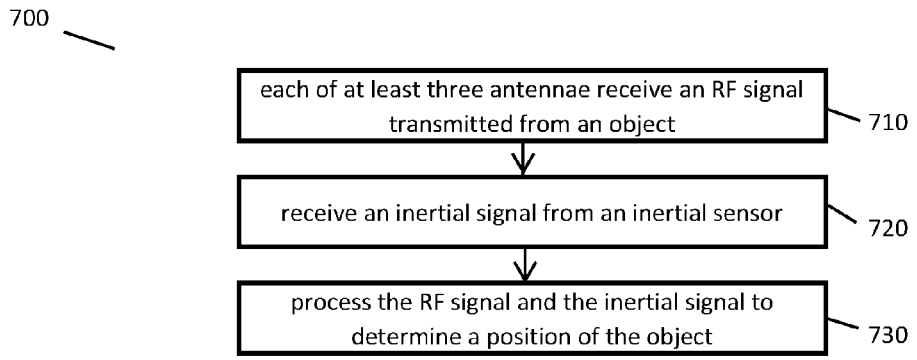
FIGS. 7a and 7b are flow diagrams for alternate embodiments of a method of tracking an object having an inertial sensor and capable of transmitting an RF signal
Figure 7B:
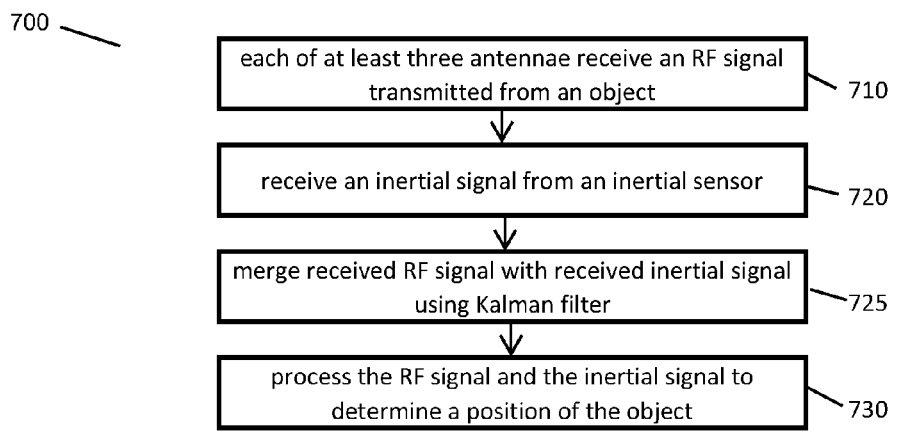

FIGS. 7a and 7b show a method 700 of tracking an object having an inertial sensor and capable of transmitting an RF signal. In step 710 of one embodiment, shown in FIG. 7a, each one of at least three antennae receives an RF signal transmitted from an object to be tracked. In step 720 the antennae receive an inertial signal from an inertial sensor integrated into or fixed onto the object. In step 730 the system processes the RF signal and the inertial signal to determine the position of the object.

In another embodiment of the method, shown FIG. 7b, the method 700 may also comprise the step 725 of merging the received RF signal with the received inertial signal using a Kalman or similar filter. In other embodiments of the method 700, one or more inertial sensors may be used, including combinations of gyroscopes, accelerometers, and magnetic sensors. Also, the processing step 730 may include applying a fusing algorithm to the received RF signal and the received inertial signal. The method 700 may be used to determine the position of an object in two or three dimensions as explained above regarding the system. Additionally, the processing step 730 may be broken into a first step of pre-processing the received RF signal and a second step of processing the inertial signal. The method 700 may also embody variations and combinations of each embodiment described above.

Aspects of the position tracking system 1 and method 700 for using radio signals and inertial sensing can be executed on various computing platforms and/or using various programming languages. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of an object having an inertial sensor and capable of transmitting a radio frequency (RF) signal, the method comprising:
   each of at least three antennae receiving an RF signal emitted from the object;
   receiving an inertial signal from the inertial sensor; and
   processing the RF signal and the inertial signal to determine a position of the object, by applying a fusing algorithm to the received RF signal and the received inertial signal.

2. The method of claim 1, wherein the inertial sensor is selected from the group consisting of a gyroscope, an accelerometer, and a magnetic sensor.

3. The method of claim 1, further comprising the step of merging the received RF signal and the received inertial signal with a Kalman filter.

4. The method of claim 1, wherein the processing step comprises determining the position of the object in two dimensions.

5. The method of claim 1, wherein the processing step comprises determining the position of the object in three dimensions.

6. The method of claim 1, wherein the processing step comprises a first step of pre-processing the received RF signal and a second step of processing the inertial signal.

7. The method of claim 1, wherein the processing step comprises a simultaneous, tightly-coupled processing of both the received RF signal and the received inertial signal data.

8. A receiver for determining a position of an object being tracked, comprising:

at least three antennae configured to receive an RF signal from the object;

an inertial input configured to receive inertial position information from the object; and a processor in communication with the at least three antennae and the inertial input, the processor receiving the RF signal and the inertial position information and determining the position of the object being tracked by applying a fusing algorithm to the received RF signal and the received inertial position information.

9. The receiver of claim 8, wherein the processor is configured to merge the received RF signal and the received inertial position information with a Kalman filter.

10. The receiver of claim 8, wherein the processor is configured to determine the position of the object in two dimensions.

11. The receiver of claim 8, wherein the processor is configured to determine the position of the object in three dimensions.

12. The receiver of claim 8, wherein the processor is configured to pre-process the received RF signal and processes the inertial position information.

13. The receiver of claim 8, wherein the processor is configured to perform a simultaneous, tightly-coupled processing of both the received RF signal and the received inertial position information.

* * * * *

UNITED STATES PATENT AND TRADEMARK OFFICE
CERTIFICATE OF CORRECTION

PATENT NO. : 8,957,812 B1  
APPLICATION NO. : 13/293639  
DATED : February 17, 2015  
INVENTOR(S) : Edward Hill and Mark Schneider It is certified that error appears in the above-identified patent and that said Letters Patent is hereby corrected as shown below:

In the Claims
Page 15, Column 12, Claim 7:
• In line 65, after the words "received inertial signal" delete the word "data".

Signed and Sealed this
Twenty-eighth Day of July, 2015

Michelle K. Lee
*Director of the United States Patent and Trademark Office*